(12) United States Patent
Kumar et al.

(10) Patent No.: US 9,983,049 B2
(45) Date of Patent: May 29, 2018

(54) ELECTRONIC COASTER FOR ESTIMATING CALORIE CONSUMPTION

(71) Applicant: Wipro Limited, Bangalore (IN)

(72) Inventors: Vijay Kumar, Bangalore (IN); Saurav Labana, Chandigarh (IN)

(73) Assignee: WIPRO LIMITED, Bangalore (IN)

( * ) Notice: Subject to any disclaimer, the term of this patent is extended or adjusted under 35 U.S.C. 154(b) by 190 days.

(21) Appl. No.: 15/068,770

(22) Filed: Mar. 14, 2016

(65) Prior Publication Data
US 2017/0219416 A1   Aug. 3, 2017

(30) Foreign Application Priority Data
Jan. 28, 2016  (IN) .............................. 201641003133

(51) Int. Cl.
| | |
|---|---|
| A47G 23/03 | (2006.01) |
| A47G 23/14 | (2006.01) |
| G01G 19/414 | (2006.01) |
| G01G 19/52 | (2006.01) |
| G06T 7/00 | (2017.01) |
| G01G 21/28 | (2006.01) |

(52) U.S. Cl.
CPC ..... *G01G 19/4146* (2013.01); *A47G 23/0306* (2013.01); *A47G 23/14* (2013.01); *G01G 19/52* (2013.01); *G01G 21/28* (2013.01); *G06T 2207/30128* (2013.01)

(58) Field of Classification Search
CPC .... G01G 19/4146; G01G 19/52; G01G 21/28; G06T 2207/30128; A47G 23/03; A47G 23/0306; A47G 23/03097; A47G 23/14
See application file for complete search history.

(56) References Cited

U.S. PATENT DOCUMENTS

| | | | | | |
|---|---|---|---|---|---|
| 2,936,163 | A | * | 5/1960 | Foster ................... | G01G 19/00 177/124 |
| 3,863,724 | A | * | 2/1975 | Dalia, Jr. ............. | G01G 3/1406 177/1 |
| 4,563,739 | A | * | 1/1986 | Gerpheide ........... | G06Q 10/087 177/25.13 |
| 4,891,755 | A | * | 1/1990 | Asher .................. | G01G 19/414 177/210 R |
| 4,911,256 | A | * | 3/1990 | Attikiouzel ........... | G01G 3/147 177/165 |

(Continued)

FOREIGN PATENT DOCUMENTS

WO    WO 2013/086372    6/2013

*Primary Examiner* — Randy Gibson
(74) *Attorney, Agent, or Firm* — Finnegan, Henderson, Farabow, Garrett & Dunner LLP

(57) ABSTRACT

The present disclosure discloses an electronic coaster for estimating amount of calories consumed by a user, through a beverage present in a beverage holder. The electronic coaster comprises at least one weight sensor to measure weight of a beverage holder comprising a beverage and a computing unit to receive the measured weight from the at least one weight sensor, determine weight of the beverage based on the received weight, identify beverage type and a predefined calorific value corresponding to the beverage type, determine change in weight from the weight of the beverage and estimate total amount of calories consumed by a user based on the change in weight and the predefined calorific value.

20 Claims, 5 Drawing Sheets

(56) References Cited

U.S. PATENT DOCUMENTS

| | | | | |
|---|---|---|---|---|
| 4,961,533 A * | 10/1990 | Teller | B67D 1/06 | 177/25.19 |
| 5,033,561 A * | 7/1991 | Hettinger | G01G 19/4146 | 177/25.16 |
| 5,044,453 A * | 9/1991 | Bankier | G01G 19/41 | 177/25.16 |
| 5,233,520 A * | 8/1993 | Kretsch | G01G 19/4146 | 128/921 |
| 5,388,043 A * | 2/1995 | Hettinger | G01G 19/4146 | 128/921 |
| 5,986,219 A * | 11/1999 | Carroll | G06Q 10/087 | 177/1 |
| 6,978,221 B1 * | 12/2005 | Rudy | G01G 19/4146 | 128/921 |
| 7,353,136 B2 * | 4/2008 | Vock | A43B 3/0005 | 702/173 |
| 8,127,605 B2 * | 3/2012 | Kolada | G01F 19/00 | 73/426 |
| 8,330,057 B2 * | 12/2012 | Sharawi | G01G 23/3728 | 177/238 |
| 8,335,550 B2 * | 12/2012 | Segman | A61B 5/0059 | 356/300 |
| 8,398,920 B2 * | 3/2013 | Hyde | A47G 19/2227 | 422/50 |
| 8,628,722 B2 * | 1/2014 | Hyde | A47G 19/2227 | 422/50 |
| 8,785,206 B2 * | 7/2014 | Hyde | A47G 19/2227 | 422/50 |
| 9,254,848 B2 * | 2/2016 | Hyde | A47G 19/2227 | |
| 9,452,866 B2 * | 9/2016 | Stieger | A47J 31/4403 | |
| 9,760,798 B2 * | 9/2017 | Kumar | G06K 9/6202 | |
| 9,782,027 B2 * | 10/2017 | Kramer | A47G 19/025 | |
| 2006/0052983 A1 | 3/2006 | Vock et al. | | |
| 2007/0024465 A1 | 2/2007 | Howell et al. | | |
| 2009/0299154 A1 * | 12/2009 | Segman | A61B 5/0059 | 600/301 |
| 2010/0138166 A1 | 6/2010 | Do et al. | | |
| 2011/0029255 A1 * | 2/2011 | Hyde | A47G 19/2227 | 702/25 |
| 2013/0137490 A1 * | 5/2013 | Quehl | G01F 23/0015 | 455/567 |
| 2013/0151168 A1 * | 6/2013 | Hyde | A47G 19/2227 | 702/25 |
| 2013/0151169 A1 * | 6/2013 | Hyde | A47G 19/2227 | 702/25 |
| 2013/0157232 A1 * | 6/2013 | Ehrenkranz | G01G 19/4146 | 434/127 |
| 2014/0316663 A1 * | 10/2014 | Hyde | A47G 19/2227 | 701/49 |
| 2015/0011845 A1 * | 1/2015 | Yuen | G06F 19/3418 | 600/301 |
| 2015/0168365 A1 * | 6/2015 | Connor | G01N 33/02 | 356/51 |
| 2016/0045049 A1 * | 2/2016 | Kim | G01G 17/06 | 248/550 |

* cited by examiner

ELECTRONIC COASTER FOR ESTIMATING CALORIE CONSUMPTION

TECHNICAL FIELD

The present disclosure relates to a device and method for estimating amount of calories in a fluid. More specifically, the present disclosure relates to an electronic coaster for estimating calories consumed by a user through a beverage present in a beverage holder placed on the electronic coaster.

BACKGROUND

In general, people tend to socialize over beverages. In a typical scenario, people tend to consume over the normal level of healthy consumption in the guise of enjoyment and elation. However, with growing health concerns related to diabetes, obesity and other lifestyle diseases, more and more people want to keep a check on their calorie intake. In a social setting, the person consuming the beverage may not be aware of the amount of the beverage consumed and amount of calories associated with the amount of beverage consumed. For a person suffering from health issues, keeping a count on amount of beverage and calories consumed may seem important.

Current technology provides ways to estimate and notify the amount of calories consumed by a person in real time. The technology also provides ways to place an order through a user interface associated with a table the user is seated in. However, the user may have to constantly make use of the user interface to place a new order. In some scenarios, for example a bar, a user may consume alcohol and may not be able to use the user interface efficiently. In another example, an aged user may not be able to use the complex features presented in the user interface. Also, there does not exist a device to estimate amount of the beverage consumed by a user and inform a concerned personnel to attend the user on requirement.

SUMMARY

The present disclosure illustrates an electronic coaster for estimating amount of calories consumed by a user through a beverage present in a beverage holder. The electronic coaster determines weight of the beverage, thereby estimates amount of calories consumed by the user based on the determined weight. The estimated amount of calories is then notified to the user.

In an embodiment, the present disclosure illustrates an electronic coaster comprising at least one weight sensor to measure weight of a beverage holder comprising a beverage and a computing unit to receive the measured weight from the at least one weight sensor, determine weight of the beverage based on the received weight, identify beverage type and a predefined calorific value corresponding to the beverage type, determine change in weight from the weight of the beverage and estimate total amount of calories consumed by a user based on the change in weight and the predefined calorific value.

In an embodiment, the present disclosure illustrates a method for estimating calories consumed by a user through a beverage, placed on an electronic coaster. The method comprising measuring weight of a beverage holder comprising a beverage, by at least one weight sensor of the electronic coaster, receiving, by a computing unit of the electronic coaster, the measured weight, determining weight of the beverage based on the received weight, identifying beverage type and a predefined calorific value corresponding to the beverage type, determining change in weight from the weight of the beverage and estimating total amount of calories consumed by the user based on the change in weight and the predefined calorific value.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE ACCOMPANYING DRAWINGS

The novel features and characteristic of the disclosure are set forth in the appended claims. The disclosure itself, however, as well as a preferred mode of use, further objectives and advantages thereof, will best be understood by reference to the following detailed description of an illustrative embodiment when read in conjunction with the accompanying figures. One or more embodiments are now described, by way of example only, with reference to the accompanying figures wherein like reference numerals represent like elements and in which:

DETAILED DESCRIPTION

Figure 1:
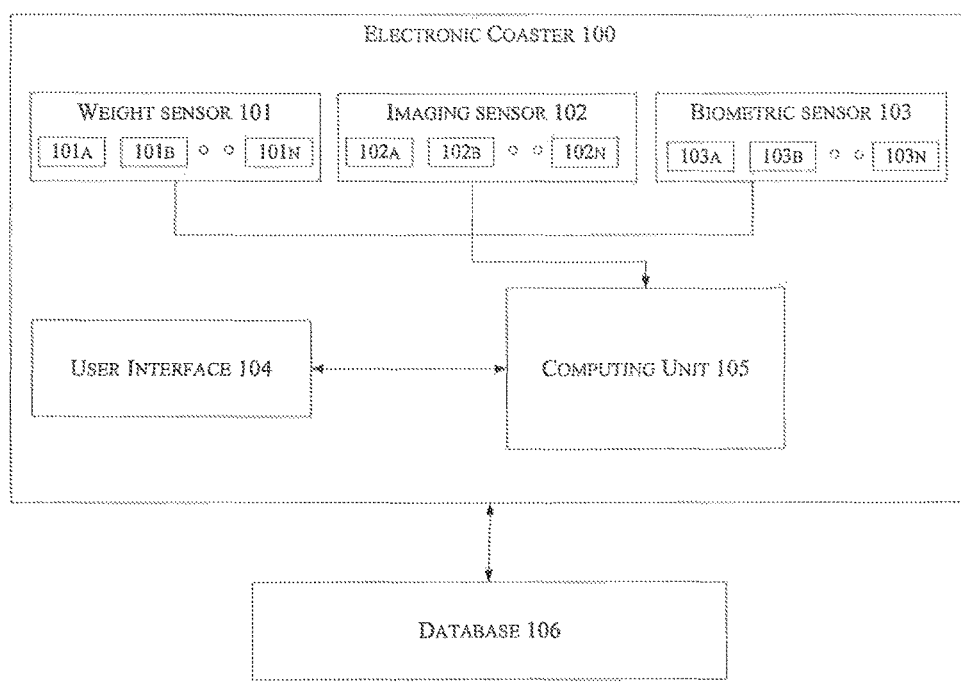
FIG. 1 illustrates an exemplary block diagram of an electronic coaster for estimating amount of calories consumed by a user through a beverage, in accordance with some embodiments of the present disclosure.

In the present document, the word "exemplary" is used herein to mean "serving as an example, instance, or illustration." Any embodiment or implementation of the present subject matter described herein as "exemplary" is not necessarily to be construed as preferred or advantageous over other embodiments.

While the disclosure is susceptible to various modifications and alternative forms, specific embodiment thereof has been shown by way of example in the drawings and will be described in detail below. It should be understood, however that it is not intended to limit the disclosure to the particular forms disclosed, but on the contrary, the disclosure is to cover all modifications, equivalents, and alternative falling within the scope of the disclosure.

The terms "comprises", "comprising", or any other variations thereof, are intended to cover a non-exclusive inclusion, such that a setup, device or method that comprises a list of components or steps does not include only those components or steps but may include other components or steps not expressly listed or inherent to such setup or device or method. In other words, one or more elements in a system or apparatus proceeded by "comprises . . . , a" does not, without more constraints, preclude the existence of other elements or additional elements in the system or apparatus.

Embodiments of the present disclosure relate to an electronic coaster for estimating amount of calories consumed by a user, through a beverage present in a beverage holder. The electronic coaster determines weight of the beverage, thereby estimating amount of calories consumed by the user based on the determined weight. The estimated amount of calories consumed is then notified to the user by the electronic coaster.

FIG. 1 of the present disclosure illustrates a block diagram of an electronic coaster 100 in accordance with some embodiments of the present disclosure.

The electronic coaster 100 comprises a weight sensor 101A, a weight sensor 101B, . . . , a weight sensor 101N, collectively represented as at least one weight sensor 101. The electronic coaster 100 further comprises an imaging sensor 102A, an imaging sensor 102B, . . . , an imaging sensor 102N, collectively represented as at least one imaging sensor 102. Also, the electronic coaster 100 comprises a biometric sensor 103A, a biometric sensor 103B, . . . , a biometric sensor 103N, collectively represented as a least one biometric sensor 103. The electronic coaster 100 further comprises a computing unit 105 communicatively coupled to the at least one weight sensor 101, at least one imaging sensor 102 and the at least one biometric sensor 103. The at least one weight sensor 101 is configured in the electronic coaster 100 to measure weight of a beverage present in a beverage holder placed on the electronic coaster 100. Firstly, the computing unit 105 obtains a predefined weight of empty beverage holder from a database 106 associated with the electronic coaster 100. In an embodiment, the computing unit 105 may receive the weight of the empty beverage holder from the at least one weight sensor. Then, the computing unit 105 receives the measured weight of the beverage present in the beverage holder from the at least one weight sensor 101. The, the computing unit 105 determines weight of the beverage by subtracting the weight of the empty beverage holder from the weight of the beverage holder comprising the beverage. Further, the computing unit 105 identifies type of the beverage using the at least one imaging sensor 102. Based on the identified beverage, the computing unit 105 identifies a predefined calorific value corresponding to the identified beverage type using database 106. The computing unit 105 then determines a change in weight from the weight of the beverage. The computing unit 105 ascertains a change in weight corresponding to the change in amount of beverage. Further, the computing unit 105 estimates total amount of calories consumed by the user based on the change in weight and the predefined calorific value.

In an embodiment, the computing unit 105 receives weight of the beverage holder comprising the beverage. A change in weight is determined by the computing unit 105 when current weight of the beverage increases or decreases from first measurement of weight of the beverage. In an exemplary embodiment, the first measurement of weight of the beverage may be denoted as first weight of beverage in the present disclosure.

In an embodiment, for every instance of the change in weight from the first weight of the beverage, the computing unit 105 receives a subsequent weight from the at least one weight sensor 101. From the received subsequent weight, the computing unit 105 determines a subsequent weight of the beverage. In one instance, the subsequent weight of the beverage is the weight received by the computing unit 105, corresponding to the changed weight of the beverage from the first weight of the beverage. The subsequent weight received with respect to the first weight of the beverage may be termed as first subsequent weight of the beverage. Here, the first weight of the beverage, is considered as weight determined prior to the first subsequent weight of the beverage. Subsequently, when there is further change in weight from the first subsequent weight of the beverage, the computing unit 105 receives another subsequent weight. Further, the computing unit 105 determines a second subsequent weight of the beverage from the second subsequent weight. Here, the first subsequent weight of the beverage is considered as weight determined prior to the second subsequent weight of the beverage.

Further, the computing unit 105 determines a change in weight by calculating difference between the subsequent weight and weight measured prior to the subsequent weight to estimate the total amount of calories. For the first time, the change in weight is determined by calculating difference between the first weight of the beverage and the first subsequent weight of the beverage. Subsequently, the change in weight is determined by calculating, the difference between the second subsequent weight of the beverage and the first subsequent weight of the beverage. In an embodiment, the change in weight is determined for every instance of change in weight of beverage from the first weight of beverage. Here, the change in weight may represent amount of beverage consumed by the user. As illustrated, the amount of calories consumed by the user is estimated based on the amount of beverage consumed by the user and the predefined calorific value.

In an embodiment, the database 106 is associated with the electronic coaster 100. The database 106 comprises plurality of types of beverages and the corresponding predefined calorific values. The computing unit 105 identifies the type of beverage present in the beverage holder using the at least one imaging sensor 102. The computing unit 105 receives at least one image of the beverage. Further, the computing unit 105 determines spectral signature of the beverage from the at least one image. Then, the computing unit 105 identifies the beverage type by comparing the determined spectral signature of the beverage with predefined spectral signature of plurality of beverages stored in the database 106. For the identified beverage type, the computing unit 105 further identifies a calorific value corresponding to the beverage type. In one embodiment, the database 106 may also store weight of empty beverage holder. Here, the weight of empty beverage holder is measured by the at least one weight sensor 101 and is stored in the database 106. The weight of the empty beverage holder is used to determine weight of the beverage from the weight of the beverage holder comprising the beverage. The database 106 can be connected to the electronic coaster 100 through one of wired network or wireless network. In an embodiment, the computing unit 105 may receive the weight of the empty beverage holder from the at least one weight sensor 101.

In one embodiment, the predefined calorific value corresponds to a predefined amount of the beverage type identified. The total amount of calories consumed by the user is estimated by calculating a multiple of the amount of beverage consumed by the user and the predefined calorific value for the identified beverage type.

In an embodiment, the total amount of calories is estimated when the subsequent weight is lesser than the weight measured prior to the subsequent weight. In an exemplary embodiment, when the subsequent weight of beverage is higher than the weight measured prior to the subsequent weight, the beverage holder is considered to be refilled with the beverage. Upon refilling the beverage holder with the beverage, a change in weight is detected by the computing unit 105. But, the change in weight may not be due to consumption of beverage by the user. The change in weight of beverage may be due to refilling of the beverage may not be considered for estimating the total amount of calories consumed by the user.

In an embodiment, the electronic coaster 100 further comprises a user interface 104. A user can interact with the electronic coaster 100 through the user interface 104. The user interface 104 receives one or more inputs from the user. In an embodiment, the one or more inputs may include, but are not limited to, user registration details, choice of beverage, amount of the beverage, budget, etc. The estimated total amount of calories consumed by the user is displayed to the user through the user interface 104.

In an embodiment, the electronic coaster 100 further comprises a biometric sensor 103 to identify one or more users associated with the electronic coaster 100. Upon identifying the user, the electronic coaster 100 may intimate the concerned personnel to provide one or more services to the user based on the one or more inputs stored in the database 106.

In an embodiment, the computing unit 105 is further configured to compare the amount of calories consumed by the user with a predefined threshold value for calorie consumption and notify the user based on the comparison. Here, the threshold value for calorie consumption may be personalized for each user. In an embodiment, the user's personalization details may include but is not limited to health condition, allergies, age, height, gender, weight, etc.

Figure 2:
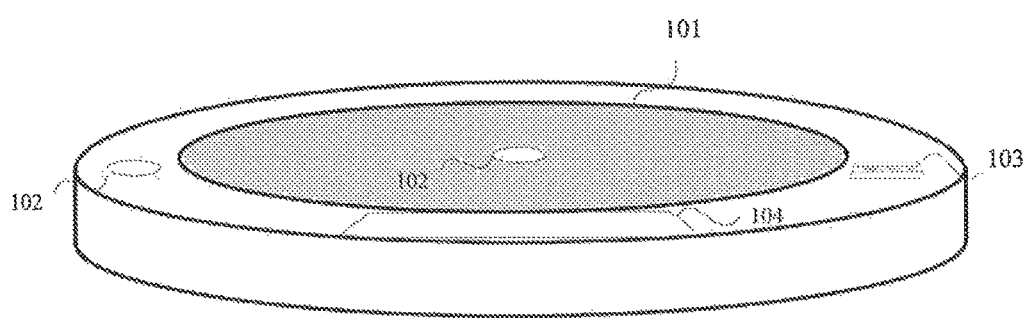
FIG. 2 shows a three-dimensional view of an electronic coaster in accordance with some embodiments of the present disclosure.

FIG. 2 of the present disclosure illustrates structure of the electronic coaster 100. The figure illustrates integration of sensors with the electronic coaster 100. The electronic coaster 100 may be made up of a hard enclosure to house one or more sensors (101, 102 and 103), circuitry etc. The hard enclosure may be one of plastic, metal, fibre, etc., or any material durable enough to hold a beverage holder. In an embodiment, the hard enclosure can he a waterproof material.

The at least one weight sensor 101 is configured in the electronic coaster 100 as shown in the FIG. 2. The at least one weight sensor 101 is configured to continually measure weight of the beverage holder placed on the electronic coaster 100. First the computing unit 105 obtains weight of empty beverage holder from the database 106 associated with the electronic coaster 100. Then the computing unit 105 receives the weight of the beverage holder comprising the beverage. From the weight of the empty beverage holder and the weight of the beverage holder comprising the beverage, the computing unit 105 determines the weight of the beverage. Further, a change in weight from the weight of the beverage is calculated by the computing unit 105 to estimate amount of beverage consumed by the user. For the amount of beverage consumed, the computing unit 105 estimates the amount of calories consumed by the user.

In an embodiment, the at least one imaging sensor 102 is positioned in the electronic coaster 100 to capture at least one image of the beverage present in the beverage holder. The image is then received by the computing unit 105 to identify type of beverage present in the beverage holder. The computing unit 105 may employ any image processing technique to identify the beverage type. In an embodiment, at least one imaging sensor 102 is one of Red Green Blue (RGB) sensors, hyper-spectral sensors or any type of imaging sensors 102 capable to assist in identifying the type of beverage.

In an embodiment, the biometric sensor 103 is configured in the electronic coaster 100 to identify one or more users associated with the electronic coaster 100. The biometric sensor 103 is at least one of a fingerprint sensor, iris recognition sensor, pulse monitor sensor, voice detection sensor, gesture monitoring sensor, Echo Cardiograph (ECG) based sensors, pressure pattern sensor etc.

The present disclosure shows a user interface 104 integrated with the electronic coaster 100. The user interface 104 helps receive the one or more inputs from the user and display information to the user.

Figure 3:
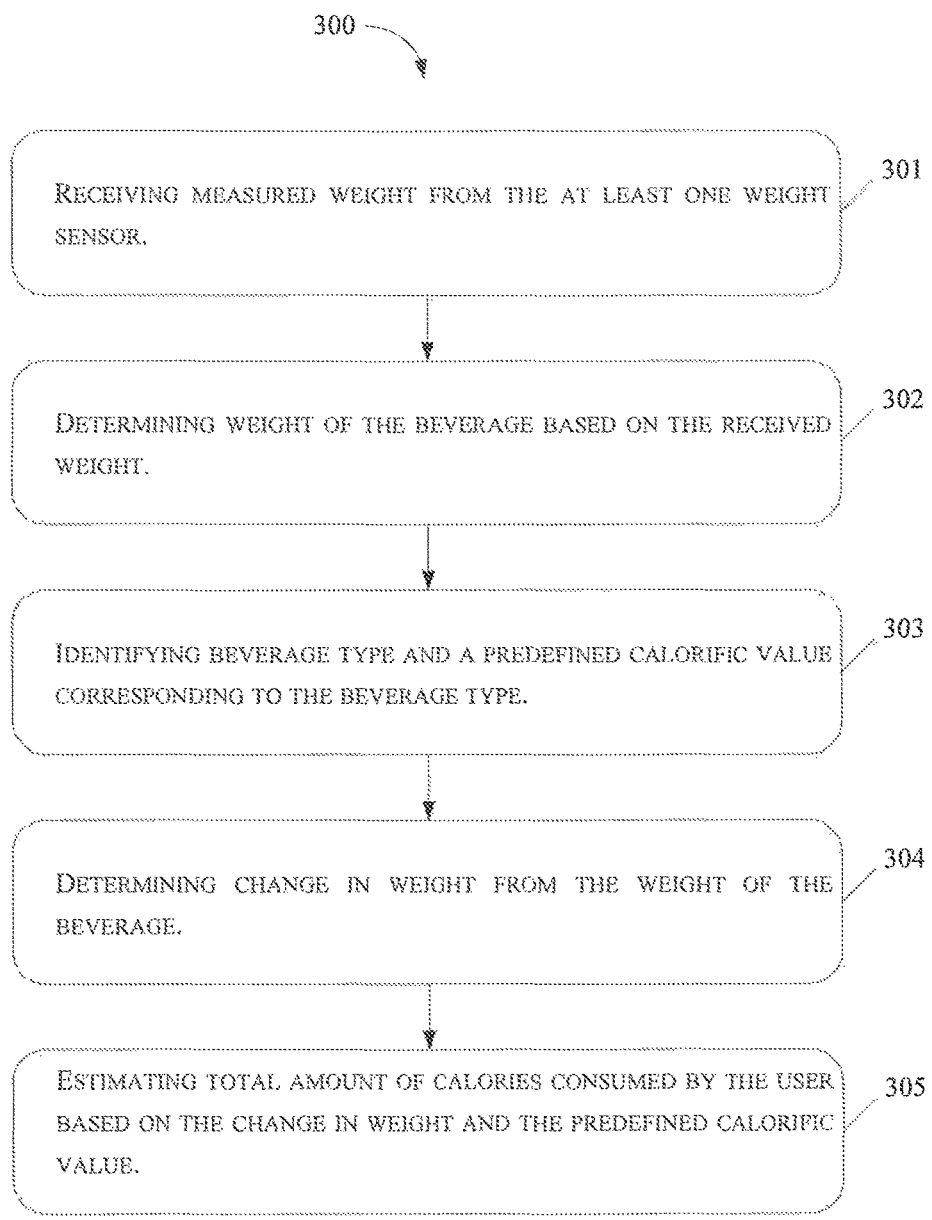
FIG. 3 shows an exemplary flow chart illustrating a method for estimating amount of calories consumed by a user through a beverage present in a beverage holder in accordance with some embodiments of the present disclosure.

FIG. 3 shows a flowchart illustrating a method for estimating amount of calories consumed by a user, through a beverage present in a beverage holder in accordance with some embodiments of the present disclosure.

As illustrated in FIG. 3, the method 300 may comprise one or more steps to identify a beverage by an electronic coaster 100. The method 300 may be described in the general context of computer executable instructions.

The order in which the method 300 is described is not intended to be construed as a limitation, and any number of the described method blocks can be combined in any order to implement the method. Additionally, individual blocks may be deleted from the methods without departing from the spirit and scope of the subject matter described herein. Furthermore, the method can be implemented in any suitable hardware, software, firmware, or combination thereof.

Initially, the computing unit 105 obtains weight of empty beverage holder from the database 106.

At step 301, receive a measured weight from the at least one weight sensor 101. The computing unit 105 receives the weight of the beverage holder comprising the beverage and the weight of the beverage holder when empty.

At step 302, determine weight of the beverage. The computing unit 105 determines the weight of the beverage by subtracting the weight of the empty beverage holder from the weight of the beverage holder comprising the beverage.

At step 303, identify the beverage type and a predefined calorific value corresponding to the identified beverage type. Here, the at least one imaging sensor 102 captures at least one image of the beverage present in the beverage holder. Then the computing unit 105 receives the at least one image from the at least one imaging sensor 102. Then, the computing unit 105 identities the beverage type based on the at least one image. For the identified beverage type, the computing unit 105 further identifies a calorific value corresponding to the beverage type from the database 106.

In an embodiment, the database 106 associated with the electronic coaster 100 stores predefined calorific value of plurality of types of beverages. Upon identifying the beverage type, the computing unit 105 fetches corresponding calorific value from the predefined calorific value of plurality of types of beverages.

At step 304, determine change in weight from weight of the beverage. In an embodiment, the change in weight is determined by the computing unit 105 when current weight of the beverage increases or decreases from first measurement of weight of the beverage In an embodiment, for every instance of the change in weight from the weight of the beverage, the computing unit 105 receives a subsequent weight from the at least one weight sensor 101. Further, the computing unit 105 determines a subsequent weight of the beverage from the subsequent weight. The determined subsequent weight of the beverage is the weight corresponding to the change in weight from the first measurement of weight of the beverage. Similarly, the computing unit 105 may receive further subsequent weight for every instance of change in weight from the weight of the beverage from the weight of the beverage.

At step 306, estimate total amount of calories consumed by the user based on the change in weight from the weight of beverage and the predefined calorific value. For every instance of the change in weight from the weight of the beverage, the computing unit 105 estimates the total amount of calories consumed by the user. The computing unit 105 determines amount of beverage consumed by the user based on change in weight of the beverage. Further, the computing unit 105 estimates the amount calories consumed by the user by calculating a multiple of amount of beverage consumed by the user and the identified predefined calorific value.

Figure 4:
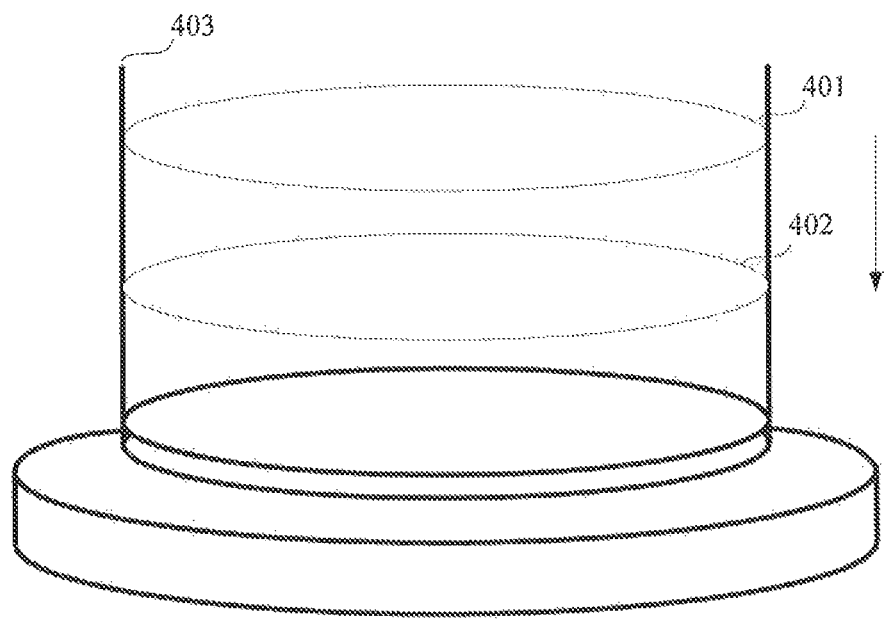
FIG. 4 shows an exemplary electronic coaster for estimation of amount of calories when the beverage level decreases.

FIG. 4 of the present disclosure shows an exemplary electronic coaster 100 illustrating estimation of amount of calories when beverage level decreases. In FIG. 4, let 403 represent the beverage holder, let 401 represent amount of beverage at level $l_1$ and let 402 represent amount of beverage at level $l_2$. First, the computing unit 105 obtains weight of the empty beverage holder 403 from the database 106. In an embodiment, the computing unit 105 may receive the weight of the empty beverage holder 403 from the at least one weight sensor 101. Then, the computing unit 105 receives weight of the beverage holder 403 comprising the beverage at $l_1$ 401. The computing unit 105 determines weight of the beverage by subtracting the weight of the empty beverage holder 403 from the weight of the beverage holder 403 comprising the beverage at $l_1$ 401. In some time, let the amount of beverage be reduced to $l_2$ 402, thus resulting in a corresponding change in weight from the weight of the beverage. For the change in weight from the weight of the beverage holder 403, the computing unit 105 receives a subsequent weight. From the subsequent weight, a subsequent weight of the beverage is determined by the computing unit 105. Referring to FIG. 4, the subsequent weight of the beverage corresponds to weight of the beverage determined at $l_2$ 402. Further, the computing unit 105 determines amount of beverage consumed by the user by subtracting the weight of beverage at $l_2$ 402 from weight of the beverage at $l_1$ 401. For the determined amount of beverage consumed by the user, the computing unit 105 estimates amount of calories consumed by the user based on the change in weight and the predefined calorific value.

Figure 5:
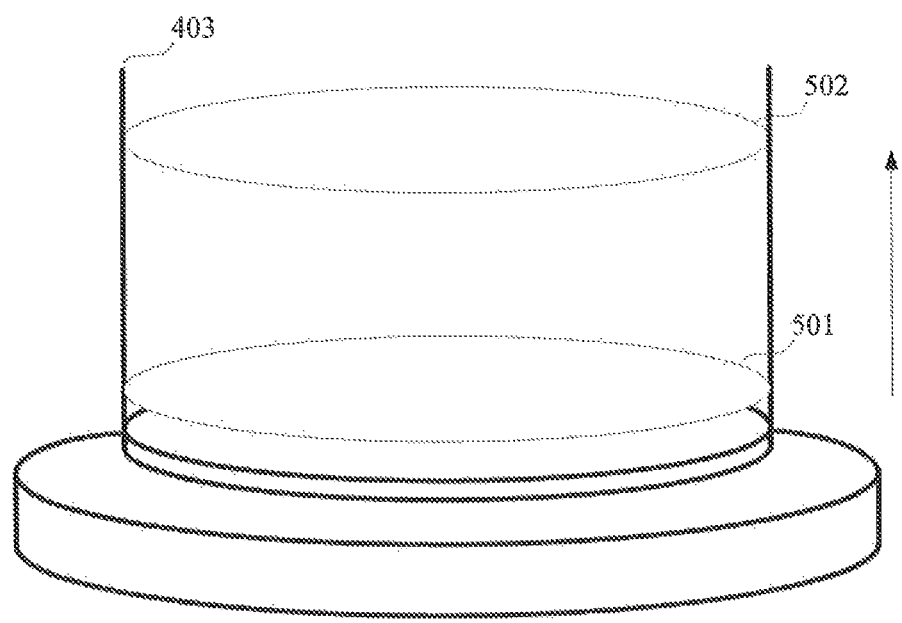
FIG. 5 shows an exemplary electronic coaster for estimation of amount of calories when beverage level increases; and It should be appreciated by those skilled in the art that any block diagrams herein represent conceptual views of illustrative systems embodying the principles of the present subject matter.

FIG. 5 of the present disclosure shows an exemplary electronic coaster 100 illustrating estimation of amount of calories when the beverage level increases. Let 501 represent beverage level $l_3$ as shown in the diagram. Let 502 represent refilled beverage level $l_4$ as shown in the diagram. As illustrated above, the computing unit 105 estimates amount of calories consumed by the user based on the change in weight. In an embodiment, the computing unit 105 estimates amount of calories when the subsequent weight is lesser than the weight measured prior to the subsequent weight. Referring back to FIG. 4, let weight measured by the at least one weight sensor 101 corresponding to $l_3$ be a subsequent weight to the weight measured corresponding to $l_2$. Upon refilling the beverage holder 403 with the beverage to level $l_4$, the computing unit 105 receives a subsequent weight corresponding to weight measured at $l_4$. Here, the subsequent weight is more than weight measured prior to the subsequent weight. Hence, difference between the subsequent weight and weight measured prior to the subsequent weight may result in a negative value. Thereby, although there is a change in weight from the weight of the beverage, the computing unit 105 does not estimate the amount of calories corresponding to the determined change in weight. A mode when the subsequent weight is more than the weight measured prior to the subsequent weight may be presumed as beverage refill by the computing unit 105.

In an embodiment, a user can register with the electronic coaster 100 using the user interface 104 configured in the electronic coaster 100. When the user approaches the electronic coaster 100, the user interface 104 prompts the user for registration. Here, the user inputs the registration details. The registration details may include, but is not limited to, users' name, a password, address of residence, health condition, allergies, age, height, weight, etc. The registration details corresponding to the user are stored in the database 106 associated with the electronic coaster 100.

In an embodiment, the biometric sensor 103 configured in the electronic coaster 100 identifies a user associated with the electronic coaster 100. In an embodiment, during registration the user may provide at least one biometric sample. The at least one biometric sample may include, but is not limited to finger print, image of iris, pulse sample, voice sample, etc. The at least one biometric sample is stored in the database 106 along with the registration details corresponding to the user. During the user's subsequent visit, the electronic coaster 100 may identify the user using the biometric sensor 103 and the registration details. In an embodiment, a user may opt not to register with the electronic coaster 100.

In an embodiment, the user can also input other details during registration, which include, but are not limited to choice of beverages, budget, emergency contact number and preferred amount of beverage. The user inputs are also stored in the database 106. Upon identifying the user by the biometric sensor 103, the electronic coaster 100 may suggest the user a beverage through the user interface 104, based on the registration details and the other inputs provided by the user. The electronic coaster 100 may also suggest amount of beverage to be consumed by the user based on the personalization details of the user stored in the database 106. Also, the electronic coaster 100 may suggest a beverage based on the height, gender, weight and age of the user.

In an embodiment, the electronic coaster 100 may suggest the user, one or more beverages based on the registration details. Here, the electronic coaster 100 coaster fetches the one or more beverages from the database 106 based on the budget of the user's choice.

In an embodiment, the database 106 is configured with details of at least one of type of beverage, brand name, calorific value, presence of alcohol content in the beverage, presence of sugar content in the beverage, price and reference image.

In an embodiment, the electronic coaster 100 may determine rate of consumption of the beverage by the user based on change of weight of the beverage. Further, the electronic coaster 100 may suggest beverages to the user based on the rate of consumption of the beverage.

In an embodiment, the electronic coaster 100 may estimate an average rate of sale of each beverage type based on the number of times each of the beverage type is identified. Further, the estimated rate of sale may be used for statistical analysis of total sales of each beverage type.

The terms "an embodiment", "embodiment", "embodiments", "the embodiment", "the embodiments", "one or more embodiments", "some embodiments", and "one embodiment" mean "one or more (but not all) embodiments of the invention(s)" unless expressly specified otherwise.

The terms "including", "comprising", "having" and variations thereof mean "including but not limited to", unless expressly specified otherwise.

The enumerated listing of items does not imply that any or all of the items are mutually exclusive, unless expressly specified otherwise. The terms "a", "an" and "the" mean "one or more", unless expressly specified otherwise.

A description of an embodiment with several components in communication with each other does not imply that all such components are required. On the contrary a variety of optional components are described to illustrate the wide variety of possible embodiments of the invention.

When a single device or article is described herein, it will be readily apparent that more than one device/article (whether or not they cooperate) may be used in place of a single devise/article. Similarly, where more than one device or article is described herein (whether or not they cooperate), it will be readily apparent that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the invention need not include the device itself.

The illustrated operations of FIG. 3 show certain events occurring in a certain order. In alternative embodiments, certain operations may be performed in a different order, modified or removed. Moreover, steps may be added to the above described logic and still conform to the described embodiments. Further, operations described herein may occur sequentially or certain operations may be processed in parallel. Yet further, operations may be performed by a single processing unit or by distributed processing units.

Technical Advantages of the Present Invention

Embodiments of the present disclosure illustrate an electronic coaster for estimating amount of calories consumed by a user, through a beverage present in a beverage holder.

In an embodiment, the present disclosure displays the amount of calories consumed by the user, thereby alerting the user when the amount of calories consumed exceeds a predefined threshold value. Thus, the user can constantly keep a check on the amount of calories consumed through the beverage.

In an embodiment, the present disclosure illustrates a method and a device for enabling timely service to one or more users consuming a beverage. Here, an attendant is notified when the beverage holder is empty, thereby the attendant can provide service according to the one or more inputs provided by the user during registration.

In an embodiment, the disclosure provides a method and a device to identify a beverage placed in a beverage holder and intelligently suggests a similar beverage type upon completion of the beverage by the user.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based here on. Accordingly, the disclosure of the embodiments of the invention is intended to be illustrative, but not limiting, of the scope of the invention, which is set forth in the following claims.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

REFERRAL NUMERALS

| Reference number | Description |
| --- | --- |
| 100 | Electronic coaster |
| 101 | Weight sensor |
| 102 | Imaging sensor |
| 103 | Biometric sensor |
| 104 | User interface |
| 105 | Computing unit |
| 106 | Database |

What is claimed is:

1. An electronic coaster, comprising:
   at least one weight sensor to:
   measure weight of a beverage holder comprising a beverage;
   at least one image sensor to:
   capture an image of beverage in the beverage holder; and
   a computing unit to:
   receive the measured weight from the at least one weight sensor;
   determine weight of the beverage based on the received weight;
   determine spectral signature of the beverage based on the image of the beverage; identify beverage type based on the spectral signature by comparing the determined spectral signature of the beverage with predefined spectral signature of plurality of beverages stored in a database;
   identify a predefined calorific value corresponding to the beverage type;
   determine change in weight from the weight of the beverage corresponding to the beverage type; and
   estimate total amount of calories consumed by a user based on the change in weight and the predefined calorific value corresponding to the beverage type.

2. The electronic coaster as claimed in claim 1, wherein for every instance of the change in weight from the weight of the beverage, the computing unit is configured to:
   receive a subsequent weight from the at least one weight sensor; and determine change in weight by calculating difference between the subsequent weight and weight measured prior to the subsequent weight to estimate the total amount of calories.

3. The electronic coaster as claimed in claim 2, wherein the total amount of calories is estimated when the subsequent weight is lesser than the weight measured prior to the subsequent weight.

4. The electronic coaster as claimed in claim 1 further comprising at least one imaging sensor to identify the beverage type.

5. The electronic coaster as claimed in claim 1, wherein the weight of the beverage is determined by subtracting weight of the beverage holder from the weight of the beverage holder comprising the beverage.

6. The electronic coaster as claimed in claim 1, wherein the predefined calorific value corresponding to the beverage type is stored in a database accessible by the electronic coaster.

7. The electronic coaster as claimed in claim 1 further comprising at least one biometric sensor to identify the user associated with the electronic coaster.

8. The electronic coaster as claimed in claim 1, further comprising a user interface to:
   display information to the user; and
   receive one or more inputs from the user.

9. The electronic coaster as claimed in claim 1, wherein the computing unit is further configured to:
   compare the amount of calories consumed by the user with a predefined threshold value for calorie consumption; and
   notify the user based on the comparison.

10. The electronic coaster as claimed in claim 9, wherein the threshold value for calorie consumption is personalized for the user.

11. A method for estimating calories consumed by a user through a beverage, placed on an electronic coaster, comprising:
   measuring, by at least one weight sensor of the electronic coaster, weight of a beverage holder comprising a beverage;
   receiving, by a computing unit of the electronic coaster, the measured weight from the at least one weight sensor;
   determining, by the computing unit, weight of the beverage based on the received weight;
   determining, by the computing unit, spectral signature of the beverage based on the image of the beverage;
   identifying, by the computing unit, beverage type based on the spectral signature by comparing the determined spectral signature of the beverage with predefined spectral signature of plurality of beverages stored in a database;
   identifying, by the computing unit, predefined calorific value corresponding to the beverage type;
   determining, by the computing unit, change in weight from the weight of the beverage corresponding to the beverage type; and
   estimating, by the computing unit, total amount of calories consumed by the user based on the change in weight and the predefined calorific value corresponding to the beverage type.

12. The method as claimed in claim 11, wherein for every instance of the change in weight from the weight of the beverage, the method comprises:
   receiving a subsequent weight from the at least one weight sensor;
   determining change in weight by calculating difference between the subsequent weight and weight measured prior to the subsequent weight to estimate the total amount of calories.

13. The method as claimed in claim 12, wherein the total amount of calories is estimated when the subsequent weight is lesser than the weight measured prior to the subsequent weight.

14. The method as claimed in claim 11 further comprising identifying the beverage type by at least one imaging sensor configured in the electronic coaster.

15. The method as claimed in claim 11, wherein the weight of the beverage is determined by subtracting weight of the beverage holder from the weight of the beverage holder comprising the beverage.

16. The method as claimed in claim 11, wherein the predefined calorific value corresponding to the beverage type is stored in a database accessible by the electronic coaster.

17. The method as claimed in claim 11 further comprising identifying the user associated with the electronic coaster, by at least one biometric sensor.

18. The method as claimed in claim 11, further comprising:
   displaying, by a user interface configured in the electronic coaster, information to the user; and
   receiving by the user interface, one or more inputs from the user.

19. The method as claimed in claim 11, wherein the computing unit is further configured to:
   compare the amount of calories consumed by the user with a predefined threshold value for calorie consumption; and
   notify the user based on the comparison.

20. The method as claimed in claim 19, wherein the threshold value for calorie consumption is personalized for the user.

* * * * *